(12) United States Patent  (10) Patent No.: US 8,495,132 B2
Saito et al.  (45) Date of Patent: Jul. 23, 2013

(54) INFORMATION PROCESSING SYSTEM

(75) Inventors: Kazuyuki Saito, Kanagawa (JP);
Masaaki Isozaki, Kanagawa (JP);
Yasuyuki Kinoshita, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 429 days.

(21) Appl. No.: 12/420,136

(22) Filed: Apr. 8, 2009

(65) Prior Publication Data

US 2009/0259716 A1  Oct. 15, 2009

(30) Foreign Application Priority Data

Apr. 10, 2008  (JP) ................................. 2008-102502

(51) Int. Cl.
*G06F 15/16* (2006.01)
(52) U.S. Cl.
USPC ........................................................ 709/203
(58) Field of Classification Search
USPC ................. 709/201, 202, 203, 217, 223, 224, 709/225, 227, 229
See application file for complete search history.

(56) References Cited

U.S. PATENT DOCUMENTS

| | | | |
|---|---|---|---|
| 2004/0136347 A1* | 7/2004 | Fuke et al. | 370/338 |
| 2005/0278415 A1* | 12/2005 | Corbea et al. | 709/202 |
| 2007/0106773 A1* | 5/2007 | Gallino et al. | 709/223 |
| 2007/0270203 A1 | 11/2007 | Aida | |
| 2008/0147360 A1* | 6/2008 | Fejes et al. | 703/2 |

FOREIGN PATENT DOCUMENTS

| | | |
|---|---|---|
| JP | 2003115018 A | 4/2003 |
| JP | 2004171523 A | 6/2004 |
| JP | 2005157822 A | 6/2005 |
| JP | 2007257018 A | 10/2007 |
| JP | 2007306953 A | 11/2007 |

OTHER PUBLICATIONS

Partial translation of Notice of Rejection for corresponding Japanese Patent Application No. 2008-10502, dated Apr. 6, 2010.

* cited by examiner

*Primary Examiner* — Scott Christensen
(74) *Attorney, Agent, or Firm* — Mattew B. Dernier, Esq.; Gibson & Dernier LLP

(57) ABSTRACT

Provided is an information processing system, in which: a server (2) transmits processing result identification information to a client (3), and records the transmitted processing result identification information as transmitted identification information; the client (3) receives the processing result identification information from the server (2), records the processing result identification information, executes predetermined processing in a state where the received processing result identification information is recorded, irrespective of a state of a communicative connection with the server (2), records processing result information indicating an execution result of the predetermined processing, and transmits the recorded processing result information to the server (2), along with the processing result identification information; and the server (2) performs acceptance processing for the processing result information received in a case where the received processing result identification information corresponds to the transmitted identification information which has been recorded, and nullifies the transmitted identification information.

13 Claims, 8 Drawing Sheets

FIG.3

| USER ID | TRANSMITTED IDENTIFICATION INFORMATION Is |
|---|---|
| user1 | xxx123456 |
| user2 | 789012abc |
| user2 | d987654ef |
| user3 | 345yyy012 |
| ⋮ | ⋮ |

FIG.4

| USER ID | POINT |
|---|---|
| user1 | 123 |
| user2 | 567 |
| user3 | 1432 |
| ⋮ | ⋮ |

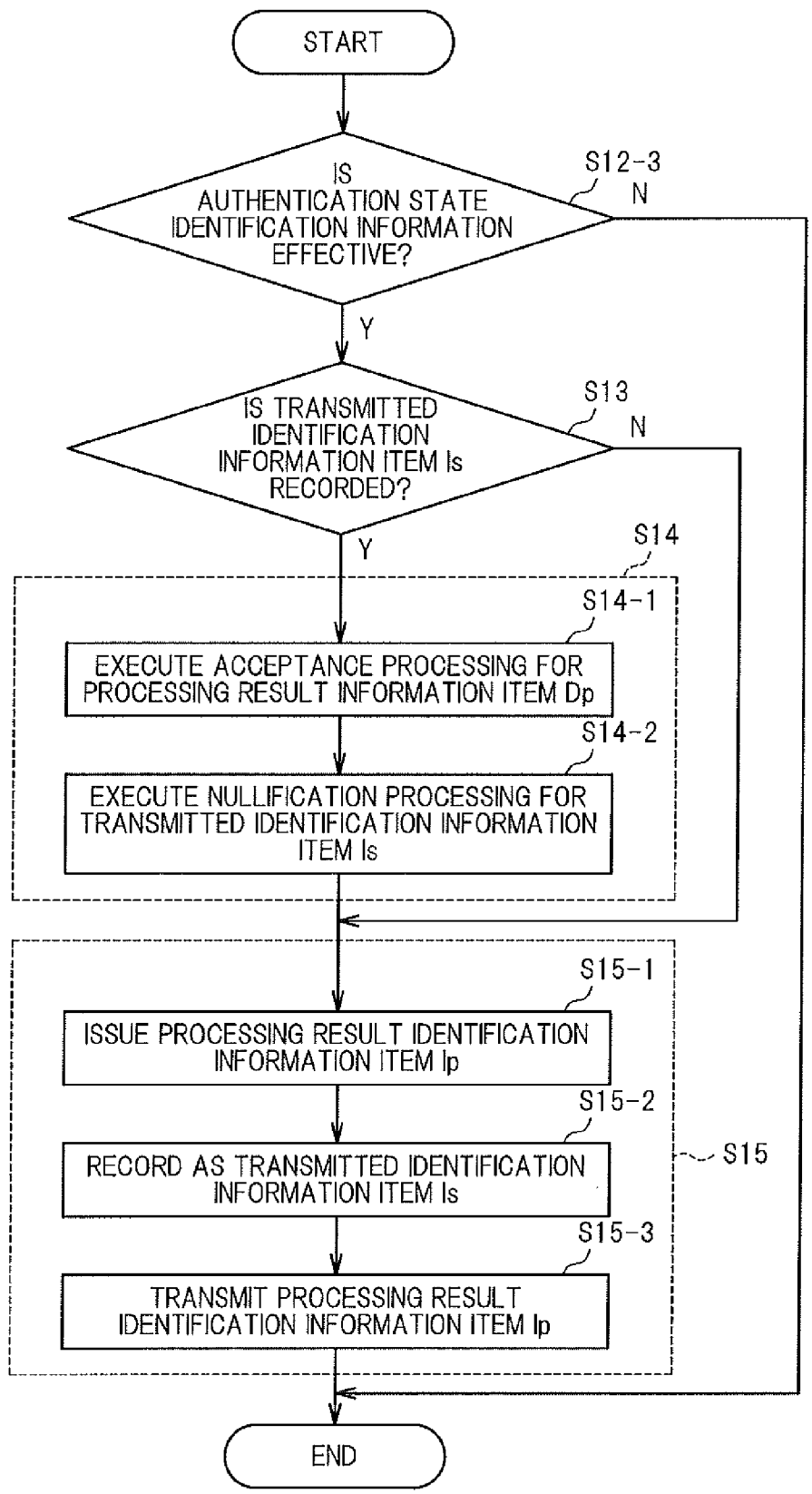

INFORMATION PROCESSING SYSTEM

BACKGROUND OF THE INVENTION

1. Field of the Invention

The present invention relates to an information processing system for using a server to manage a result of processing executed by a client, a client and a server for the information processing system, an information processing method, and an information storage medium.

2. Description of the Related Art

There is known an information processing system of a client/server type which distributively executes processing between a client and a server. Examples of using such an information processing system include an situation where a plurality of clients each execute predetermined processing and transmit processing results to a server, and the server records the processing results transmitted from the respective clients, or follows some other procedure to thereby perform centralized management of the processing results at the server end.

The technology according to the conventional example presupposes that the client and the server always maintain a communicative connection established between the two via network. However, particularly in a case where, for example, the processing performed on a client end takes a long period of time, or is intermittently executed plurality of times, the communicative connection may not always be maintained depending on the content of the processing executed by the client. In such a case, the client temporarily records a processing result obtained by executing predetermined processing, and when the communicative connection again becomes established to the server, transmits the recorded processing result. In this case, if the client unnecessarily transmits the recorded processing result repeatedly a plurality of times to the server due to a user's illegal operation, a communication fault between the client and the server, or other similar faults, the server may inadvertently accept a single processing result from the client more times than it needs.

SUMMARY OF THE INVENTION

The present invention has been made in view of the above-mentioned circumstances, and one of the objects thereof is to provide an information processing system, a client, a server, an information processing method, and an information storage medium, which can prevent a server from redundantly accepting one processing result in a case where a result of processing executed by a client is managed on the server.

In order to solve the above-mentioned problems, an information processing system according to the present invention includes a client and a server that can be communicatively connected to each other, the server including: processing result identification information transmitting means for transmitting processing result identification information to the client, and recording the transmitted processing result identification information as transmitted identification information; processing result information receiving means for receiving processing result information, which indicates a result of predetermined processing executed by the client, from the client, along with the processing result identification information; and processing result information accepting means for, if the processing result identification information received from the client corresponds to the transmitted identification information which has been recorded, performing acceptance processing for the processing result information received along with the processing result identification information, and nullifying the transmitted identification information, the client including: processing result identification information receiving means for receiving the processing result identification information from the server, and recording the received processing result identification information; processing executing means for executing the predetermined processing in a state where the received processing result identification information is recorded, irrespective of a state of a communicative connection with the server, and recording the processing result information indicating an execution result of the predetermined processing; and processing result information transmitting means for transmitting the recorded processing result information to the server, along with the recorded processing result identification information.

Further, in the information processing system: if the processing result information receiving means receives the processing result information from the client, the processing result identification information transmitting means may transmit new processing result identification information to the client irrespective of whether or not the processing result information accepting means performs the acceptance processing for the received processing result information; and if the new processing result identification information is received, the processing result identification information receiving means may nullify the processing result identification information recorded in the past, and record the received new processing result identification information.

Further, in the information processing system: the processing result identification information receiving means may record the received new processing result identification information, and initialize the recorded processing result information; and when the predetermined processing is executed, the processing executing means may update the recorded processing result information based on information corresponding to the recorded processing result information and a new execution result.

Further, in the information processing system, the processing result information accepting means may execute, as the acceptance processing for the processing result information, processing for updating information regarding a processing result of the predetermined processing recorded on the server based on information corresponding to the recorded information regarding the processing result and the received processing result information.

Further, in the information processing system: the processing result information may include numerical value information; the processing result information accepting means may execute, as the acceptance processing for the processing result information, processing for updating the numerical value information recorded on the server by adding a numerical value represented by the received processing result information to the numerical value information recorded on the server; the processing result identification information receiving means may record the received new processing result identification information, and initialize the recorded processing result information to "0"; and when the predetermined processing is executed, the processing executing means may update the recorded processing result information by adding a numerical value corresponding to the new execution result to the numerical value represented by the recorded processing result information.

Further, in the information processing system: the processing result identification information transmitting means may record the processing result identification information as the transmitted identification information in association with a user to whom the processing result identification information is to be transmitted; the processing result information receiving means may receive the processing result information along with user-related information for identifying the user; if the processing result identification information received from the client corresponds to the transmitted identification information which has been recorded in association with the user identified by the user-related information received along with the processing result identification information, the processing result information accepting means may perform the acceptance processing for the processing result information received along with the processing result identification information, and nullify the transmitted identification information recorded in association with the user; the processing result identification information receiving means may record the processing result identification information received from the server in association with the user to whom the processing result identification information has been transmitted; the processing executing means may record the processing result information in association with the user to be subjected to the predetermined processing; and the processing result information transmitting means may transmit the recorded processing result information to the server along with the processing result identification information recorded in association with the user associated with the processing result information and the user-related information for identifying the user.

Further, a server according to the present invention, which can be communicatively connected to a client, includes: processing result identification information transmitting means for, before the client executes predetermined processing, transmitting processing result identification information to the client, and recording the transmitted processing result identification information as transmitted identification information; processing result information receiving means for receiving processing result information, which indicates a result of the executed predetermined processing, from the client, along with the processing result identification information; and processing result information accepting means for, if the processing result identification information received from the client corresponds to the transmitted identification information which has been recorded, performing acceptance processing for the processing result information received along with the processing result identification information, and nullifying the transmitted identification information.

Further, a client according to the present invention, which can be communicatively connected to a server, includes: processing result identification information receiving means for receiving processing result identification information from the server, and recording the received processing result identification information; processing executing means for executing predetermined processing in a state where the received processing result identification information is recorded, irrespective of a state of a communicative connection with the server, and recording processing result information indicating an execution result of the predetermined processing; and processing result information transmitting means for transmitting the recorded processing result information to the server, along with the recorded processing result identification information, in which the transmitted processing result identification information is used for judging whether or not acceptance processing for the transmitted processing result information is to be performed by the server.

Further, an information processing method according to the present invention, which is performed by using a computer that can be communicatively connected to a client, includes: before the client executes predetermined processing, transmitting processing result identification information to the client, and recording the transmitted processing result identification information as transmitted identification information; receiving processing result information, which indicates a result of the executed predetermined processing, from the client, along with the processing result identification information; and, if the processing result identification information received from the client corresponds to the transmitted identification information which has been recorded, performing acceptance processing for the processing result information received along with the processing result identification information, and nullifying the transmitted identification information.

Further, another information processing method according to the present invention, which is performed by using a computer that can be communicatively connected to a server, includes: receiving processing result identification information from the server, and recording the received processing result identification information; executing predetermined processing in a state where the received processing result identification information is recorded, irrespective of a state of a communicative connection with the server, and recording processing result information indicating an execution result of the predetermined processing; and transmitting the recorded processing result information to the server along with the recorded processing result identification information, in which the transmitted processing result identification information is used for judging whether or not acceptance processing for the transmitted processing result information is to be performed by the server.

Further, an information storage medium according to the present invention, which is stored with a program and is computer-readable, causes a computer that can be communicatively connected to a server to function as: processing result identification information receiving means for receiving processing result identification information from the server, and recording the received processing result identification information; processing executing means for executing predetermined processing in a state where the received processing result identification information is recorded, irrespective of a state of a communicative connection with the server, and recording processing result information indicating an execution result of the predetermined processing; and processing result information transmitting means for transmitting the recorded processing result information to the server along with the recorded processing result identification information, in which the transmitted processing result identification information is used for judging whether or not acceptance processing for the transmitted processing result information is to be performed by the server.

BRIEF DESCRIPTION OF THE DRAWINGS

In the accompanying drawings:

FIG. 3 is a diagram illustrating an example of transmitted identification information recorded on a server;

FIG. 4 is a diagram illustrating an example of information stored in a processing result management database;

FIG. 9 is a flowchart illustrating an example of a flow of processing executed by the server in the point grant-time processing.

DETAILED DESCRIPTION OF THE PREFERRED EMBODIMENT

Figure 1:
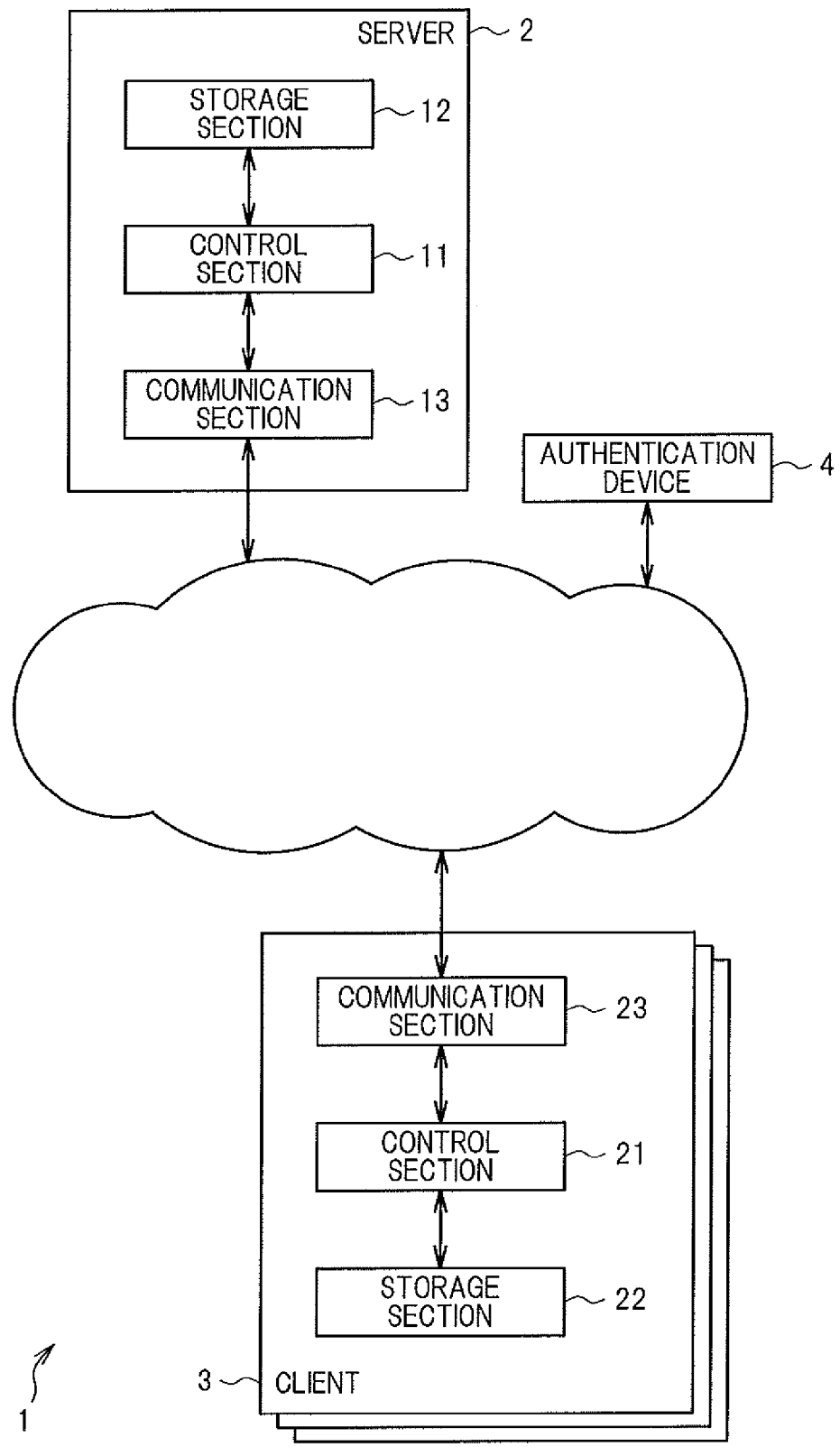
FIG. 1 is a schematic diagram illustrating an example of an overall configuration of an information processing system according to an embodiment of the present invention.

Hereinafter, an embodiment of the present invention will be described by referring to the drawings.

As illustrated in FIG. 1, an information processing system 1 according to the embodiment of the present invention is configured by including a server 2, a plurality of clients 3, and an authentication device 4. The server 2 and each of the clients 3 can be communicatively connected to each other via a communication network such as the Internet. In addition, the authentication device 4 and each of the server 2 and the clients 3 can be communicatively connected to each other.

In this embodiment, the information processing system 1 is configured to operate as a point management system. In other words, each of the clients 3 executes processing to generate a point in association with a user who uses the information processing system 1, and the server 2 grants a point to each of the users based on information transmitted from each of the clients 3, and centrally manages points granted to the respective users. Herein, the point represents numerical value information generated by each of the clients 3 executing a processing according to the user's instruction, and examples thereof may include a score that indicates the performance of a game, or numerical value information related to an execution time or a processing amount with regard to each of various kinds of processing.

The server 2 represents an information processing device for managing the point granted to each user that uses the information processing system 1 according to this embodiment. Examples of the server 2 include a server computer, and as illustrated in FIG. 1, the server 2 is configured by including a control section 11, a storage section 12, and a communication section 13.

Examples of the control section 11 include a CPU, and the control section 11 performs various kinds of information processing according to programs stored in the storage section 12. Description will be given later of a specific example of processing executed by the control section 11 in this embodiment.

The storage section 12 is configured by including a memory device such as a RAM or a ROM and a hard disk, and stores the programs executed by the control section 11. In addition, the storage section 12 also functions as a work memory for the control section 11.

Examples of the communication section 13 include a communication interface such as a LAN card, and according to an instruction issued by the control section 11, the communication section 13 transmits information via the communication network. Further, the communication section 13 receives the information reaching via the communication network, and outputs the information to the control section 11.

Each of the clients 3 represents an information processing device used by the user who uses the information processing system 1 according to this embodiment. Examples of the client 3 include a home-use game machine and a personal computer, and as illustrated in FIG. 1, the client 3 is configured by including a control section 21, a storage section 22, and a communication section 23. The control section 21, the storage section 22, and the communication section 23 may be configured in the same manner as the control section 11, the storage section 12, and the communication section 13, respectively. Note that each user may use the plurality of clients 3 on their own. Alternatively, one of the clients 3 may be shared by a plurality of users.

Examples of the authentication device 4 include a server computer, and the authentication device 4 performs authentication processing for authenticating a user who uses the client 3 in response to a request issued by the client 3. In addition, the authentication device 4 uses a technique such as single sign-on to perform control of a communicative connection between the client 3 and the server 2.

Specifically, in this embodiment, before the server 2 and the client 3 establish a communicative connection to perform data communications between each other, the user who uses the client 3 first undergoes authentication performed by the authentication device 4. In this case, in accordance with the user's instruction operation, the client 3 transmits authentication information such as a password, which is used for authenticating the user, to the authentication device 4. The authentication device 4 performs the authentication of a user by verifying the transmitted authentication information against information within a database stored in the authentication device 4, and returns authentication state identification information (session identification information) along with results of the authentication. The client 3 additionally transmits the authentication state identification information to start a communicative connection (session) to the server 2.

The server 2, which has received the authentication state identification information from the client 3, transmits the received authentication state identification information to the authentication device 4 for the purpose of a query, and thereby confirms that the user who is using the client 3 is an authorized user authenticated by the authentication device 4. Further, assuming that the server 2 receives user identification information (user ID), which is used for identifying the user, as a response to the query, even in a case where the clients 3 do not correspond to the users on a one-to-one basis, the server 2 can identify the user who is instructing to transmit the information received from the client 3. In other words, the authentication state identification information transmitted from the client 3 functions as user related information for identifying the user who is instructing to transmit the information. Herein, if the authentication state identification information is already invalid on the authentication device 4 when the server 2 issues the query to the authentication device 4, instead of accepting the information received from the client 3, the server 2 returns information to the effect that a connection from the client 3 is not permitted. Note that the authentication device 4 nullifies the held authentication state identification information in response to, for example, an explicit instruction issued by the client 3 or an elapse of a predetermined time period. With such a configuration, the client 3 can only establish a communicative connection to the server 2, to perform data communications between the two, while the authentication state identification information is being held by the authentication device 4. Note that in the following description, a state where the authentication state identification information is effectively held by the authentication device 4, with the communicative connection having been established between the server 2 and the client 3, is referred to as a "signed-in state". In addition, the user who has been authenticated by the authentication device 4 (that is, user who has signed in) in this case is referred to as an "authenticated user".

Figure 2:
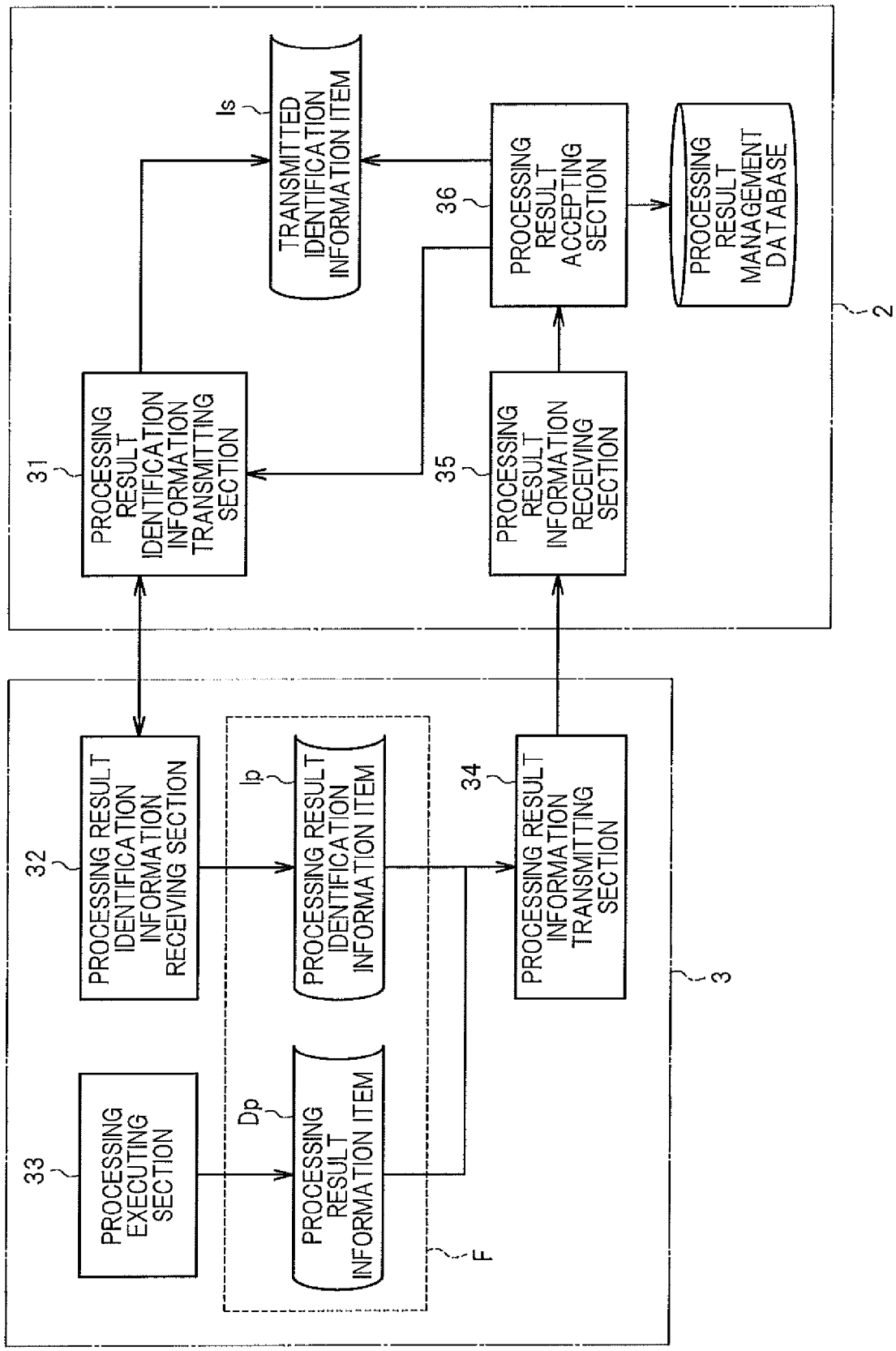
FIG. 2 is a functional block diagram illustrating an example of functions implemented by the information processing system according to the embodiment of the present invention.

Hereinafter, description is given of a specific example of functions implemented by the information processing system 1 including the above-mentioned components. As illustrated in FIG. 2, the information processing system 1 is functionally configured by including a processing result identification information transmitting section 31, a processing result identification information receiving section 32, a processing executing section 33, a processing result information transmitting section 34, a processing result information receiving section 35, and a processing result accepting section 36. Of those functions, the processing result identification information transmitting section 31, the processing result information receiving section 35, and the processing result accepting section 36 are implemented by the control section 11 of the server 2 executing programs stored in the storage section 12. Further, the processing result identification information receiving section 32, the processing executing section 33, and the processing result information transmitting section 34 are implemented by the control section 21 of the client 3 executing programs stored in the storage section 22. Note that those programs may be provided by being stored on various kinds of computer-readable information storage medium such as an optical disk, or may be provided via the communication network such as the Internet.

The processing result identification information transmitting section 31 of the server 2 issues a processing result identification information item Ip at a predetermined time. The processing result identification information transmitting section 31 then transmits the issued processing result identification information item Ip to the client 3, and also records the transmitted processing result identification information item Ip as a transmitted identification information item Is. As a specific example thereof, the processing result identification information transmitting section 31 issues the processing result identification information item Ip in a case where an issuance request for a new processing result identification information item Ip is received from the client 3, or in a case described below where the processing result information receiving section 35 receives a processing result information item Dp.

The processing result identification information item Ip represents information for identifying the processing result information item Dp to be accepted when acceptance processing for a processing result is performed by the processing result accepting section 36, and is used for preventing one processing result information item Dp from being accepted more than once. The processing result identification information item Ip may be, for example, a numerical value or a character string generated randomly. In this case, the processing result identification information transmitting section 31 uses a predetermined random number generating function to generate the processing result identification information item Ip. By thus using a random number as the processing result identification information item Ip, it can be made difficult for an illegal user to guess the processing result identification information item Ip issued by the processing result identification information transmitting section 31. Note that by widening a range of values (number of digits of the numerical value or the character string) that can be set as the random number generated at this time to a sufficient extent according to the number of users for whom points are to be managed or the number of connected clients 3, it is possible to prevent the processing result identification information item Ip from being issued redundantly. Alternatively, to issue a new processing result identification information item Ip, the processing result identification information transmitting section 31 may generate a new processing result identification information item Ip so as to have a value different from that of the processing result identification information item Ip that has already been issued and recorded as the transmitted identification information item Is.

The processing result identification information item Ip transmitted to the client 3 by the processing result identification information transmitting section 31 is recorded into the storage section 12 as the transmitted identification information item Is. Herein, the processing result identification information item Ip is transmitted by the processing result identification information transmitting section 31 in a state where the authenticated user has signed in with the communicative connection having been established between the server 2 and the client 3. Therefore, in this embodiment, the processing result identification information transmitting section 31 records the transmitted identification information item Is in association with the user ID of the authenticated user, with the authenticated user being set as a user to whom the processing result identification information item Ip is to be transmitted. For example, the processing result identification information transmitting section 31 holds such a table as illustrated in FIG. 3 in the storage section 12, and when a new processing result identification information item Ip is issued, adds the processing result identification information item Ip to the table as the transmitted identification information item Is.

Note that the processing result identification information transmitting section 31 may issue a plurality of processing result identification information items Ip in association with one user. Specifically, for example, in the above-mentioned case where one user is using the plurality of clients 3, the plurality of clients 3 may independently transmit respective issuance requests for a processing result identification information item Ip to the server 2 in the state where the user has signed in as the authenticated user. In this case, the processing result identification information transmitting section 31 transmits mutually different processing result identification information items Ip in response to the respective issuance requests, and records those processing result identification information items Ip as transmitted identification information items Is in association with the same user ID.

Prior to execution of predetermined processing (hereinafter, referred to as "point generating processing P"), the processing result identification information receiving section 32 of the client 3 receives the processing result identification information item Ip transmitted by the processing result identification information transmitting section 31 of the server 2. Then, the processing result identification information receiving section 32 records the received processing result identification information item Ip into the storage section 22. Note that in this embodiment, the processing result identification information receiving section 32 records the received processing result identification information item Ip in association with the authenticated user at the time of reception of the processing result identification information item Ip, namely, the user to whom the processing result identification information item Ip is set to be transmitted by the processing result identification information transmitting section 31.

Specifically, for example, the processing result identification information receiving section 32 judges at a predetermined time whether or not the processing result identification information item Ip is recorded in the storage section 22 in association with the user who is using the client 3. If not recorded, the processing result identification information receiving section 32 transmits an issuance request for a processing result identification information item Ip to the server 2. The processing result identification information receiving section 32 receives a processing result identification information item Ip that is transmitted by the processing result identification information transmitting section 31 in response to the issuance request, and records the processing result identification information item Ip into the storage section 22 in association with the user. In this embodiment, the processing result identification information receiving section 32 generates a separate data file F for each user that uses the client 3, and writes the processing result identification information item Ip into the data file F. Accordingly, if there exist a plurality of users that use the client 3, it is possible for the client 3 to record the processing result identification information item Ip on a user basis. Note that herein, the data file F represents a set of data corresponding to units of data operations, such as copying and deletion, that are executed by the client 3 according to the user's instructions.

Herein, as the predetermined time for judging whether or not the processing result identification information receiving section 32 is to transmit the issuance request, there is a time at which, for example, the client 3 is about to execute the point generating processing P in response to the user's instruction operation. In other words, in a case where the point generating processing P is to be executed, the processing result identification information receiving section 32 transmits an issuance request for a processing result identification information item Ip prior to the execution of the point generating processing P. Alternatively, the processing result identification information receiving section 32 may judge, at a time when a user starts to use the client 3, whether or not to transmit the issuance request with regard to the user. Further, it may be judged, every predetermined time period, whether or not to transmit the issuance request with regard to the user who is using the client 3.

The processing executing section 33 of the client 3 executes the point generating processing P, and records the processing result information item Dp indicating an execution result of the point generating processing P. In this embodiment, the point generating processing P represents processing to generate a point to be managed by the server 2 and recording the point as the processing result information item Dp, which may be implemented by various kinds of application program, including a computer game. As a specific example, the processing executing section 33 executes game processing, and generates, as the point, a numerical value indicating the performance of a game, or the like. Alternatively, the processing executing section 33 may execute the point generating processing P at a time when a predetermined process or the like is terminated, and generate, as the point, numerical value information regarding an execution time or an execution result of the process. Note that the processing executing section 33 records the numerical value information representing the generated point as the processing result information item Dp in association with the user with regard to whom the point generating processing P is to be executed (for example, the user who has instructed the execution of the point generating processing P or the user who is using the client 3 upon the execution of the point generating processing P).

Herein, the processing executing section 33 may execute the point generating processing P irrespective of the state of the communicative connection between the client 3 and the server 2. In other words, the processing executing section 33 can execute the point generating processing P with regard to the user even if the user who uses the client 3 has not been authenticated by the authentication device 4 and is not in the signed-in state. However, as described above, the point generating processing P needs to be executed after the processing result identification information receiving section 32 receives the processing result identification information item Ip and records the processing result identification information item Ip in association with the user. By thus eliminating the need for the user's authentication operation upon the execution of the point generating processing P, for example, in a case where the point generating processing P is processing that does not require the user's operation, the processing executing section 33 can automatically execute the point generating processing P at a predetermined time without accepting the user's operation.

In this embodiment, as a result of the execution of the point generating processing P, the processing executing section 33 records the processing result information item Dp representing the point into the data file F, in which the processing result identification information receiving section 32 has stored the processing result identification information item Ip, in association with the user with regard to whom the point generating processing P has been executed. Accordingly, for each user who uses the client 3, the processing result information item Dp and the processing result identification information item Ip are recorded in the same data file F in association with each other. This makes it possible to integrally handle the processing result identification information item Ip and the processing result information item Dp that are associated with the same user, and makes it difficult for a user having illegal intentions to execute an operation for copying only the processing result information item Dp into another storage area separately from the processing result identification information item Ip, or any other such operation.

Note that the processing executing section 33 may execute the point generating processing P a plurality of times with regard to one or a plurality of users before the processing result information transmitting section 34 has yet executed a transmission processing for the processing result information item Dp. In this case, at each time of execution of the point generating processing P, the processing executing section 33 updates the processing result information item Dp recorded in the storage section 22 based on information corresponding to the recorded processing result information item Dp and the execution result of a newly-executed point generating processing P. Therefore, the processing result information item Dp associated with each user becomes information obtained by accumulating execution results of the point generating processing P that is executed a plurality of times after the processing result identification information item Ip is received with regard to the user until the processing result information transmitting section 34 transmits the processing result information item Dp as described below. Herein, specifically, the processing executing section 33 updates the processing result information item Dp based on a value of the point represented by the processing result information item Dp recorded in the storage section 22, to which a point generated as the execution result of new point generating processing P is added. Accordingly, the processing result information item Dp becomes a cumulative value of the points generated by a plurality of times of point generating processing P.

In a state where the client 3 is communicatively connected to the server 2, the processing result information transmitting section 34 of the client 3 transmits the processing result information item Dp recorded by the processing executing section 33 to the server 2, along with the processing result identification information item Ip recorded by the processing result identification information receiving section 32. At this time, the processing result information transmitting section 34 transmits a pair of the processing result information item Dp and the processing result identification information item Ip, that a rerecorded in association with the same user, to the server 2 along with user-related information for identifying the user (for example, authentication state identification information transmitted from the authentication device 4 upon the signing in of the user).

Specifically, the processing result information transmitting section 34 judges, at a predetermined time, whether or not a communicative connection has been established between the client 3 and the server 2, and if established (in other words, in the case of the signed-in state), transmits the pair of the processing result information item Dp and the processing result identification information item Ip, that are recorded in association with the authenticated user, to the server 2. Note that at this time, the processing result information transmitting section 34 also transmits the authentication state identification information received from the authentication device 4.

The processing result information receiving section 35 of the server 2 receives the processing result information item Dp transmitted by the processing result information transmitting section 34 of the client 3 along with the processing result identification information item Ip and the user-related information for identifying the user.

If the processing result information receiving section 35 receives, from the client 3, the pair of the processing result information item Dp and the processing result identification information item Ip, the processing result accepting section 36 of the server 2 judges whether or not the received processing result identification information item Ip corresponds to the transmitted identification information item Is which has been recorded in the storage section 12. At this time, the processing result accepting section 36 judges not only whether or not the processing result identification information item Ip is recorded simply as the transmitted identification information item Is, but also whether or not the processing result identification information item Ip is recorded as the transmitted identification information item Is in association with the user identified by the user-related information received by the processing result information receiving section 35. Then, as a result of the judgment, if the received processing result identification information item Ip is judged as being recorded as an effective transmitted identification information item Is, the processing result accepting section 36 performs acceptance processing for the processing result information item Dp received by the processing result information receiving section 35, and performs processing to nullify the recorded transmitted identification information item Is. On the other hand, as a result of the judgment, if the received processing result identification information item Ip is judged as not being recorded as the effective transmitted identification information item Is, the processing result accepting section 36 ends the processing without performing the acceptance processing for the received processing result information item Dp.

Herein, the server 2 stores information regarding the processing result of the point generating processing P (hereinafter, referred to as "server management information") in the storage section 12. The acceptance processing for the processing result information item Dp represents processing for receiving a processing result indicated by the processing result information item Dp and reflecting contents thereof, to update the server management information. As a specific example, as the acceptance processing, the processing result accepting section 36 executes processing for updating the server management information recorded in association with the user identified by the user-related information based on information corresponding to the server management information and the newly-received processing result information item Dp. Therefore, the server management information for each user becomes information obtained by accumulating the processing result information items Dp accepted from the client 3 a plurality of times. In this case, the client 3 does not need to continuously keep storing the processing results of the point generating processing P executed in the past, and only needs to store differential information indicating the processing results of the point generating processing P executed after the server 2 last executed the acceptance processing for the processing result information item Dp, until the transmission of the processing result information item Dp is next performed.

Specifically, in this embodiment, the server 2 stores a processing result management database (DB) in the storage section 12 in order to store the server management information. As illustrated in FIG. 4, the processing result management database stores therein information associating the user ID of each user, and the point granted to the user, with each other. As the acceptance processing, the processing result accepting section 36 performs processing to add the point represented by the received processing result information item Dp to the point recorded in the processing result management DB in association with the user to whom the point is to be granted. Accordingly, the processing result of the point generating processing P executed by the client 3 is reflected in point information managed by the server 2, and the point generated by the client 3 executing the point generating processing P is granted to the user.

In addition, the processing result accepting section 36 performs nullification processing to nullify the transmitted identification information item Is. Specifically, the transmitted identification information item Is is deleted from a table recorded in the storage section 12. Alternatively, the processing result accepting section 36 may nullify the transmitted identification information item Is by updating flag information associated with the transmitted identification information item Is to a value indicating that the acceptance processing has already been executed. As a result of the nullification processing, even if the processing result information receiving section 35 again receives the processing result identification information item Ip having the same value as the nullified transmitted identification information item Is after the nullification processing, the processing result accepting section 36 does not perform the acceptance processing for the processing result information item Dp. This can prevent the server 2 from accepting one processing result information item Dp redundantly due to the user's illegal operation or the like.

Note that the acceptance processing for the processing result information item Dp and the nullification processing of nullifying the processing result identification information item Ip received along with the processing result information item Dp are executed together. In other words, if one of the acceptance processing and the nullification processing fails due to, for example, occurrence of an error, the other processing is temporarily returned to a state before the execution thereof, and both processes are executed again, for example, after the elapse of a predetermined time period. This can prevent inconsistency between the acceptance processing and the nullification processing.

Further, after the processing result accepting section 36 executes the acceptance processing and the nullification processing, the processing result identification information transmitting section 31 issues a new processing result identification information item Ip to substitute the nullified processing result identification information item Ip, and records the newly-issued processing result identification information item Ip as the transmitted identification information item Is. In addition, the processing result identification information transmitting section 31 transmits the new processing result identification information item Ip to the client 3, along with a completion notification for the acceptance processing.

In response to this transmission of information, the processing result identification information receiving section 32 of the client 3 nullifies the processing result identification information item Ip that has already been recorded, and records the newly-received processing result identification information item Ip into the storage section 22. Further, the processing result identification information receiving section 32 simultaneously performs processing to initialize the processing result information item Dp recorded in association with the nullified processing result identification information item Ip. As a specific example, the processing result identification information receiving section 32 resets the point represented by the processing result information item Dp recorded in association with the authenticated user to "0", and at the same time overwrites the processing result identification information item Ip recorded in association with the authenticated user with the newly-received processing result identification information item Ip. Accordingly, in a case where the processing result information item Dp represents the differential information obtained by accumulating the execution results of the point generating processing P executed a plurality of times, such control can be performed as to reflect only the execution results of the point generating processing P executed after the reception of the effective processing result identification information item Ip in the processing result information item Dp.

Hereinafter, description will be given of a specific example of a flow of processing executed by the server 2 and the client 3 in the information processing system 1 according to this embodiment.

Figure 5:
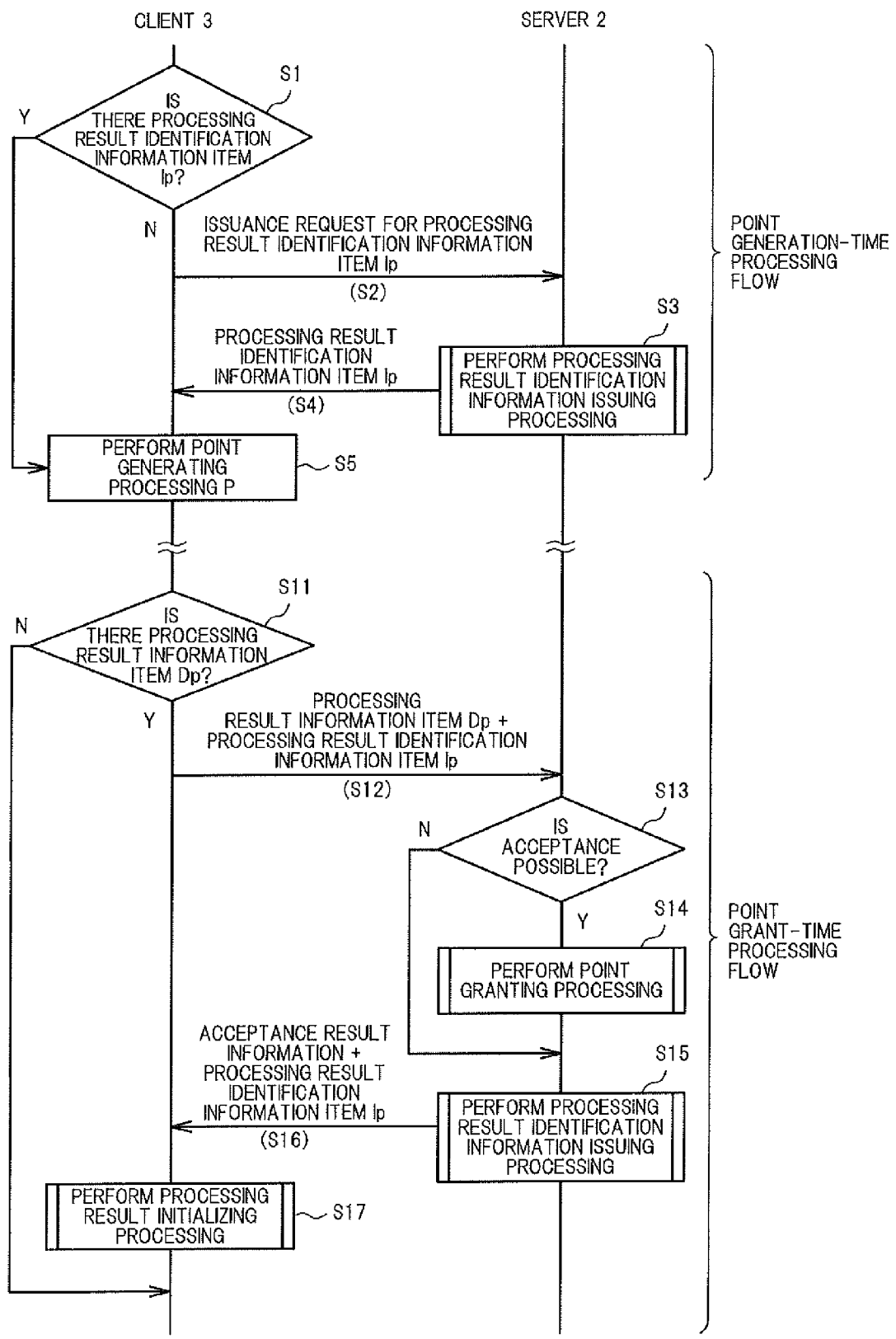
FIG. 5 is a diagram illustrating an outline of a flow of processing executed by the information processing system according to the embodiment of the present invention.

First, an outline of the flow of the processing executed by the server 2 and the client 3 is described based on a flowchart of FIG. 5. Note that details of specific processing are described later for each of the server 2 and the client 3.

The upper portion of FIG. 5 illustrates an example of a flow of processing executed when the client 3 executes the point generating processing P to generate a point (hereinafter, referred to as "point generation-time processing flow"). As illustrated in FIG. 5, the client 3 first judges whether or not the processing result identification information item Ip is recorded in the storage section 22 (S1). If it is judged in Step S that the processing result identification information item Ip is not recorded, an issuance request for a processing result identification information item Ip is transmitted from the client 3 to the server 2 (S2). In response to the issuance request transmitted in Step S2, the server 2 executes processing result identification information issuing processing (S3). The processing result identification information issuing processing represents a series of processes, in which the processing result identification information item Ip is issued and transmitted to the client 3 while the issued processing result identification information item Ip is stored into the storage section 12 as the transmitted identification information item Is. As a result of the processing result identification information issuing processing, the client 3 receives the processing result identification information item Ip transmitted from the server 2 (S4). If it is judged in Step S1 that the processing result identification information item Ip is recorded, or if the processing result identification information item Ip transmitted in Step S4 is recorded, the client 3 executes the point generating processing P, and records the processing result information item Dp (S5).

Next, the lower portion of FIG. 5 illustrates an example of a flow of processing executed when granting a point (hereinafter, referred to as "point grant-time processing flow") by reflecting the point generated by the point generation-time processing flow onto the processing result management database of the server 2. Note that the point grant-time processing flow does not need to be executed every time the point generation-time processing flow is executed, and may be executed after the point generation-time processing flow is executed a plurality of times.

As illustrated in FIG. 5, in the point grant-time processing flow, the client 3 first judges whether or not the processing result information item Dp representing the point to be granted is recorded (S11). If it is judged in Step S11 that the processing result information item Dp to be transmitted is not recorded, the client 3 ends the processing. On the other hand, if it is judged in Step S11 that the processing result information item Dp to be transmitted is recorded, the processing result information item Dp is transmitted from the client 3 to the server 2 along with the processing result identification information item Ip (S12). The server 2 that has received information transmitted in Step S12 judges whether or not the received processing result information item Dp can be accepted depending on whether or not the received processing result identification information item Ip is recorded as the transmitted identification information item Is (S13). If it is judged in Step S13 that the acceptance is possible, the server 2 executes point granting processing (S14). The point granting processing represents a series of processes, in which the acceptance processing for the processing result information item Dp is executed to update the processing result management database while the transmitted identification information item Is for which the judgment has been performed in Step S13 is nullified in order to prevent the processing result information item Dp from being accepted redundantly.

In both cases where it is judged in Step S13 that the processing result information item Dp cannot be accepted and where the processing of Step S14 is executed after the acceptance is judged as being possible, the server 2 subsequently executes the processing result identification information issuing processing (S15). The processing result identification information issuing processing is the same as that of Step S3 described above. Accordingly, a processing result identification information item Ip that is newly issued in Step S15 is transmitted from the server 2 to the client 3, along with acceptance result information indicating whether or not the point granting processing of Step S14 has been executed (S16). The client 3 that has received information transmitted in Step S16 executes processing result initializing processing (S17). The processing result initializing processing represents a series of processes, in which the processing result information item Dp for which transmission has been performed in Step S12 is initialized, while the processing result identification information item Ip for which transmission has been performed in Step S12 is updated based on the processing result identification information item Ip received in Step S16.

Herein, description is given of an example of processing executed by the server 2 and the client 3 if the communication fails between the server 2 and the client 3 in the flow of FIG. 5. First, if the issuance request for a processing result identification information item Ip, which has been transmitted in Step S2, does not reach the server 2 due to a communication error, the processing result identification information issuing processing (S3) is not executed, and the client 3 cannot receive the processing result identification information item Ip in Step S4. In this case, without executing the point generating processing P (S5), the client 3 returns to Step S, for example, after the elapse of a predetermined time period, to again execute the point generation-time processing flow, and attempts acquisition of the processing result identification information item Ip. This allows the client 3 to execute the point generating processing P in a state where the processing result identification information item Ip is recorded.

Also if the processing result identification information item Ip transmitted in Step S4 does not reach the client 3 due to a communication error, from the viewpoint of the client 3, in the same manner as the case where there occurs a communication error in Step S2, the processing result identification information item Ip cannot be received in Step S4 after the transmission processing of Step S2. Therefore, in the same manner as the case where a communication error occurs in Step S2, the point generation-time processing flow is again executed to attempt the acquisition of the processing result identification information item Ip. However, in the case where a communication error occurs in Step S4, the server 2 has already executed the processing result identification information issuing processing (S3), and the processing result identification information item Ip that has not reached the client 3 due to the communication error has already been recorded as the transmitted identification information item Is. The recorded transmitted identification information item Is cannot be a subject for which the transmission is to be performed from the client 3 in Step S12, and hence continues to be stored in the server 2 as an effective transmitted identification information item Is without being nullified by the point granting processing (S14). Therefore, for example, every time a predetermined time period elapses, the server 2 may search for the transmitted identification information item Is that has existed for a predetermined time period or longer since its issuance, to nullify such a transmitted identification information item Is.

Further, if a communication error occurs in Step S12, the client 3 cannot receive the acceptance result information in Step S16. In this case, without executing the processing result initializing processing (S17), the client 3 returns to Step S11, for example, after the elapse of a predetermined time period, to again execute the point grant-time processing flow, and attempts the transmission of the processing result information item Dp. Note that the client 3 stores the effective processing result identification information item Ip even while the point granting is not successful, and hence can execute the point generation-time processing flow to execute the point generating processing P without having a new processing result identification information item Ip issued. Accordingly, the client 3 can keep reflecting the point generated while the transmission of the processing result information item Dp to the server 2 is not successful in the processing result information item Dp, and can finally reflect the generated points into the processing result management database of the server 2 by executing the point grant-time processing flow in a state where the transmission of the processing result information item Dp to the server 2 has become possible.

Further, if a communication error occurs in Step S16, without executing the processing result initializing processing (S17), the client 3 also keeps storing the processing result identification information item Ip for which transmission has been performed in Step S12. However, in this case, the server 2 has executed the point granting processing (S14) to nullify the processing result identification information item Ip for which transmission has been performed in Step S12. Therefore, if the point generation-time processing flow is executed after a communication error occurs in Step S16, the client 3 has to execute the point generating processing P in a state where the effective processing result identification information item Ip is not stored. However, even in this case, by again executing the point grant-time processing flow after a predetermined time period has elapsed since the communication error occurred, the client 3 can have a new effective processing result identification information item Ip issued. This is because, as illustrated in the flow of FIG. 5, the server 2 executes the processing result identification information issuing processing (S15) to issue a new processing result identification information item Ip and transmit the processing result identification information item Ip to the client 3, irrespective of whether or not the acceptance processing for the processing result information item Dp has been performed by the point granting processing (S14).

Note that in a state where such an event has occurred that a new processing result identification information item Ip cannot be received in Step S16 within a predetermined period after the transmission of the processing result information item Dp in Step S12, if the point generation-time processing flow is to be executed thereafter, the client 3 may transmit an issuance request for a processing result identification information item Ip to the server 2 irrespective of judgment in the processing of Step S1 that the processing result identification information item Ip is recorded. This can prevent the client 3 from executing the point generating processing P in a state where there is a possibility that the acceptance of the newly-generated point may be rejected by the server 2.

Next, description is given of details of the processing executed by the client 3 and the server 2 in the point generation-time processing flow and the point grant-time processing flow that are exemplified in FIG. 5, respectively.

First, based on a flowchart of FIG. 6, description will be given of an example of a flow of the processing executed by the client 3 in the point generation-time processing flow that targets a given user (hereinafter, referred to as "target user").

The processing result identification information receiving section 32 of the client 3 first judges whether or not the processing result identification information item Ip is recorded in the storage section 22 in association with the target user (S1). If it is judged in Step S1 that the processing result identification information item Ip is recorded, the processing executing section 33 executes the point generating processing P to record the processing result information item Dp indicating the execution result in the storage section 22 in association with the processing result identification information item Ip (S5-1), and ends the processing (normal end). In this case, even in a state where the target user has not signed in as the authenticated user, the point generating processing P is completed normally.

On the other hand, if it is judged in Step S1 that the processing result identification information item Ip is not recorded, the processing result identification information receiving section 32 judges whether or not a signed-in state is effected (in other words, whether or not the target user has signed in as the authenticated user) (S2-1). If it is judged in Step S2-1 that a signed-in state is not effected, the processing result identification information receiving section 32 cannot receive the processing result identification information item Ip from the server 2, and hence ends the processing without executing the point generating processing P (abnormal end). In this case, in the same manner as the above-mentioned case where a communication error occurs in Step S2, the client 3 again executes the processing illustrated in FIG. 6 after the elapse of a predetermined time period. Note that in this case, the control section 21 of the client 3 may execute predetermined error processing by, for example, displaying a message to the effect that the point generating processing P cannot be executed and prompting the target user to sign in.

On the other hand, it is judged in Step S2-1 that a signed-in state is effected, the processing result identification information receiving section 32 transmits the issuance request for a processing result identification information item Ip to the server 2 (S2-2). At this time, the processing result identification information receiving section 32 transmits the issuance request along with the authentication state identification information issued by the authentication device 4 upon the signing in of the user. Then, the processing result identification information receiving section 32 receives the processing result identification information item Ip transmitted from the server 2 in response to the issuance request of Step S2-2 (S4).

After that, the processing executing section 33 executes the point generating processing P to record the processing result information item Dp indicating the execution result in the storage section 22 in association with the processing result identification information item Ip received in Step S4 (S5-2). Accordingly, the point generating processing P executed by the client 3 is completed (normal end).

Figure 6:
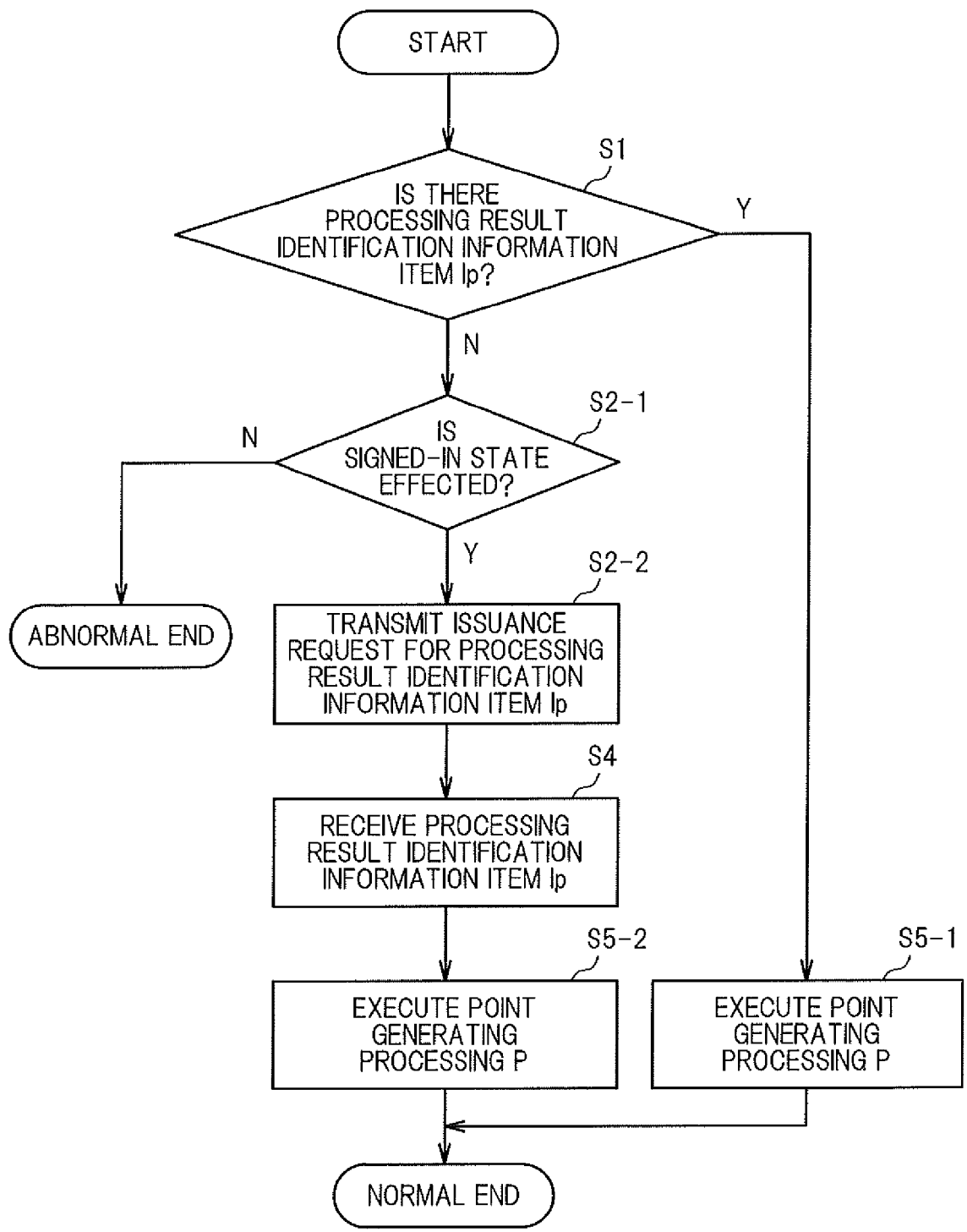
FIG. 6 is a flowchart illustrating an example of a flow of processing executed by a client in point generation-time processing.
Figure 7:
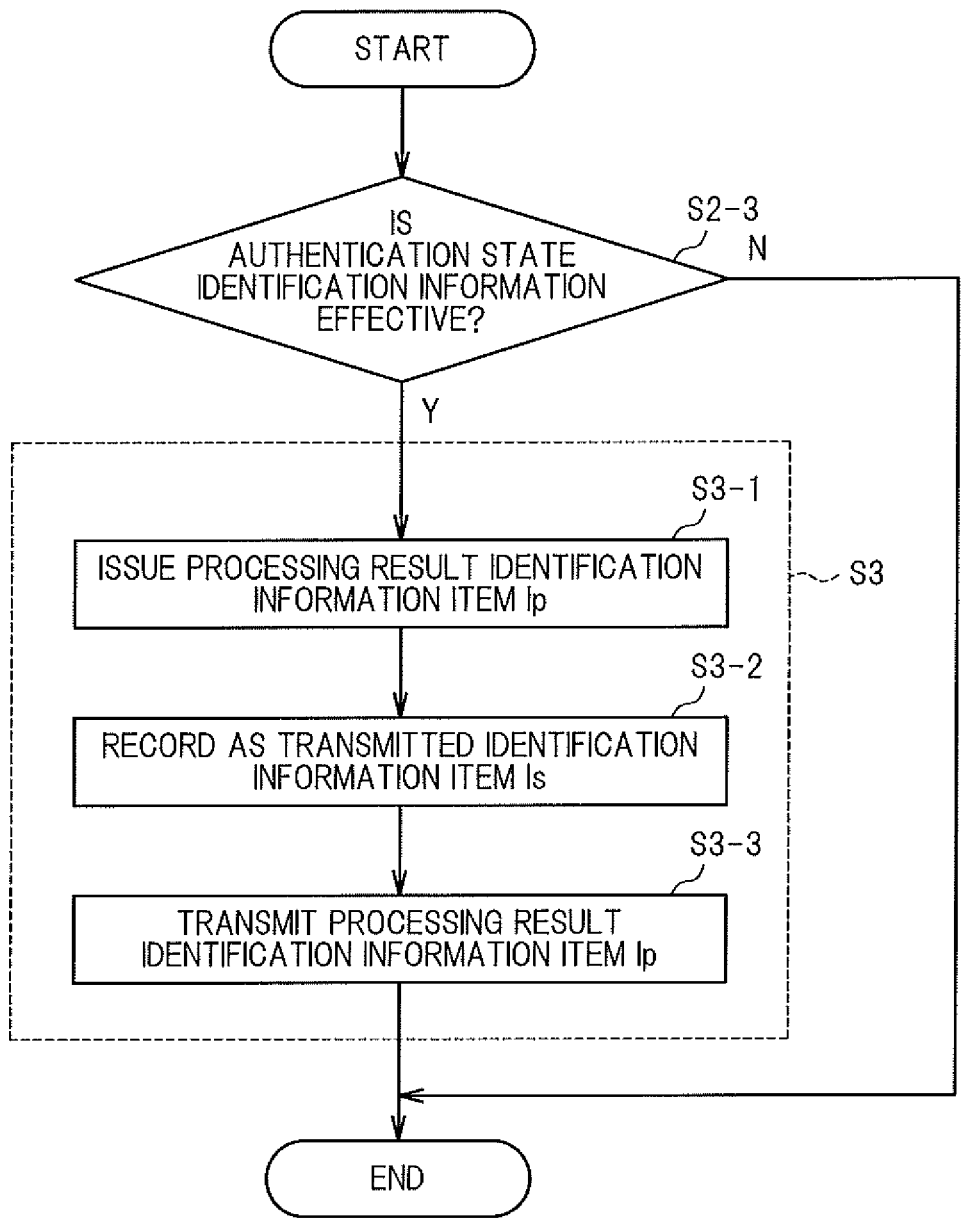
FIG. 7 is a flowchart illustrating an example of a flow of processing executed by the server in the point generation-time processing.

Next, based on a flowchart of FIG. 7, description is given of an example of the processing executed by the server 2 for transmitting the processing result identification information item Ip to be received by the client 3 in Step S4, when receiving the issuance request transmitted by the client 3 in the processing of Step S2-2 in FIG. 6 described above.

First, the processing result identification information transmitting section 31 issues a query to the authentication device 4 by using the authentication state identification information included in the received issuance request, to thereby verify whether or not the authentication state identification information is effective (S2-3). If the verification fails in Step S2-3, the server 2 ends the processing without accepting the issuance request. Also in this case, in the same manner as the case where a communication error occurs in Step S2 in the flow of FIG. 5, the processing is executed again.

On the other hand, if the verification is successful in Step S2-3, the processing result identification information transmitting section 31 executes the processing result identification information issuing processing (S3). In other words, first, a new processing result identification information item Ip is issued (S3-1). Then, the issued processing result identification information item Ip is recorded into the storage section 12 as the transmitted identification information item Is in association with the user ID of the target user (S3-2). At this time, the processing result identification information transmitting section 31 may acquire the user ID of the target user from the authentication device 4 in the verification processing of Step S2-3. Alternatively, the client 3 may transmit the user ID along with the issuance request in the processing of Step S2-2 of FIG. 6. Subsequently, the processing result identification information transmitting section 31 transmits the processing result identification information item Ip issued in Step S3-1 to the client 3 that has transmitted the issuance request (S3-3), and ends the processing.

Note that as described above, if it is judged in Step S that the processing result identification information item Ip is not recorded in association with the target user, in Step S2-2, the client 3 requests the server 2 to issue a new processing result identification information item Ip. Therefore, for example, even if the target user has already used a given client 3 while having the processing result identification information item Ip issued, in order to use another client 3 for the first time, the another client 3 requests the server 2 to issue a new processing result identification information item Ip. Further, instead of issuing one processing result identification information item Ip to each user, in a case where one user uses a plurality of clients 3, the server 2 issues a plurality of processing result identification information items Ip corresponding to the plurality of clients 3 in association with the one user, and records those processing result identification information items Ip respectively as the transmitted identification information items Is. Accordingly, if the issuance request for a processing result identification information item Ip is received from each of the clients 3, the server 2 does not need to judge, for each user, whether or not the transmitted identification information item Is has already been recorded, and can issue the processing result identification information item Ip by the same series of processes as illustrated in FIG. 7.

Figure 8:
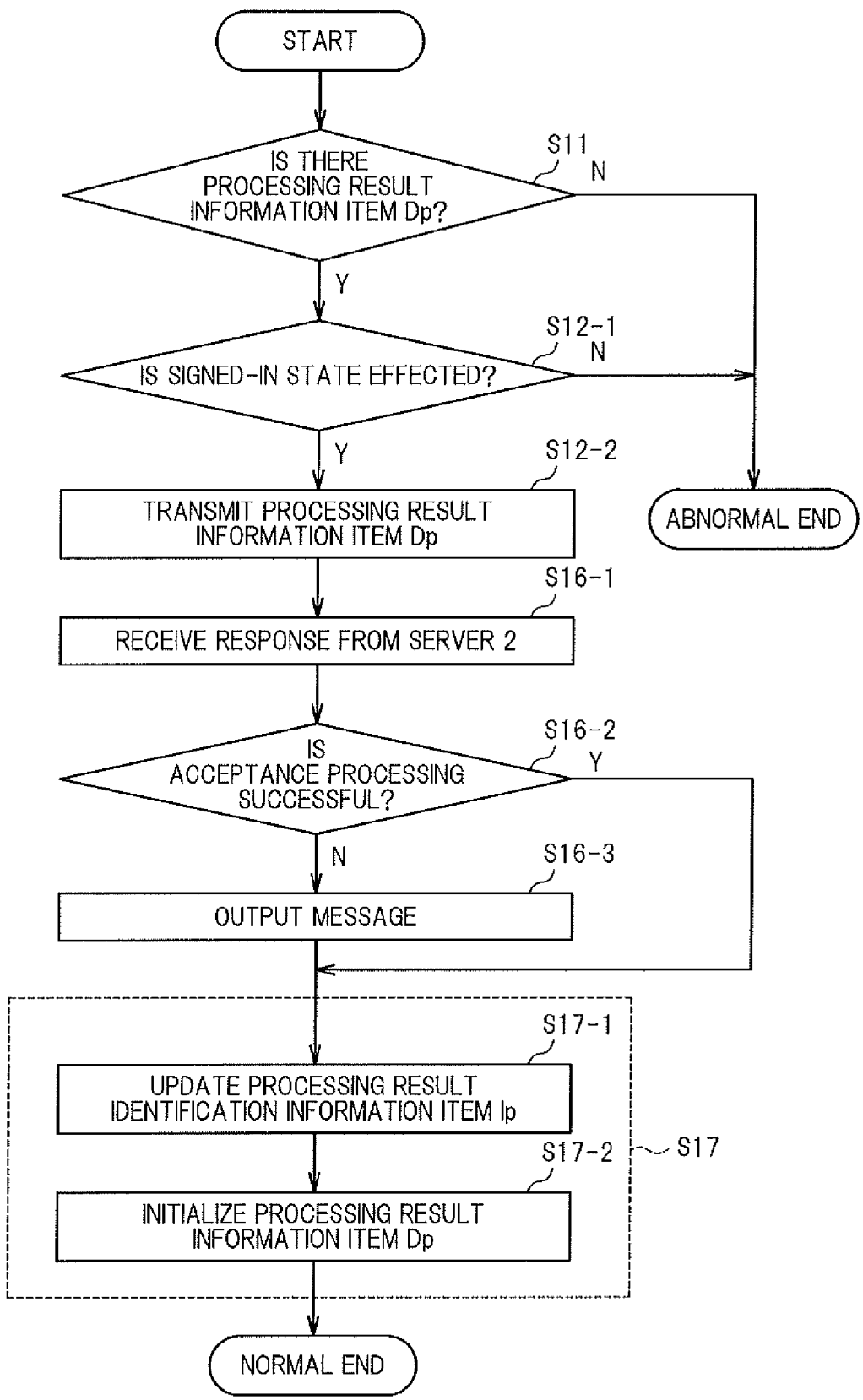
FIG. 8 is a flowchart illustrating an example of a flow of processing executed by the client in a point grant-time processing.

Next, based on a flowchart of FIG. 8, description is given of an example of a flow of the processing executed by the client 3 in the point grant-time processing flow. Note that the processing described herein, for example, may be executed for each user that uses the client 3 every predetermined time period, or maybe executed for the target user when the point generating processing P is completed or at some other such time point.

First, the processing result information transmitting section 34 judges whether or not the processing result information item Dp output by the processing executing section 33 is recorded in the storage section 22 (S11). If it is judged in Step S11 that the processing result information item Dp is not recorded, there exists no processing result information item Dp to be transmitted to the server 2, and therefore the processing result information transmitting section 34 aborts the processing (abnormal end).

On the other hand, if it is judged in Step S11 that the processing result information item Dp is recorded, the processing result information transmitting section 34 further judges whether or not the target user has signed in as the authenticated user to have a signed-in state effected (S12-1). If it is judged in Step S12-1 that the target user is not in a signed-in state, the processing result information item Dp cannot be transmitted to the server 2, and therefore the processing result information transmitting section 34 aborts the processing (abnormal end). In this case, in the same manner as the case where a communication error occurs in Step S12 in the flow of FIG. 5, the processing is executed again later.

On the other hand, if it is judged in Step S12-1 that the target user is in a signed-in state, the processing result information transmitting section 34 transmits to the server 2 the processing result information item Dp and the processing result identification information item Ip, which are recorded in association with each other by the processing of Step S5-1 or S5-2 in the above-mentioned flow of FIG. 6 (S12-2). At this time, the processing result information transmitting section 34 transmits the authentication state identification information received by the authentication device 4 together.

Subsequently, the client 3 receives a response made by the server 2 to information transmitted in Step S12-2 (S16-1). The response includes the acceptance result information indicating whether or not the acceptance processing for the processing result information item Dp transmitted in Step S12-2 is successful, and the newly-issued processing result identification information item Ip.

Subsequently, the processing result identification information receiving section 32 of the client 3 judges whether or not the acceptance result information received in Step S16-1 indicates that the acceptance processing is successful (S16-2). If it is judged in Step S16-2 that the server 2 has returned a failure in accepting the processing result information item Dp, the client 3 outputs a predetermined message to present to the target user the fact that the point has not been accepted (S16-3).

In both cases where it is judged in Step S16-2 that a success in the acceptance has been returned and where the message is output in Step S16-3 in response to the failure in the acceptance, the processing result identification information receiving section 32 subsequently executes the processing result initializing processing (S17). Specifically, the processing result identification information receiving section 32 updates the processing result identification information item Ip (in other words, processing result identification information item Ip for which transmission has been performed in Step S12-2) recorded in the storage section 22 in association with the target user, based on the processing result identification information item Ip received in Step S16-1 (S17-1). Further, the point represented by the processing result information item Dp recorded in the storage section 22 in association with the target user is initialized to "0" (S17-2), and the processing is brought to an end (normal end).

Next, based on a flowchart of FIG. 9, description is given of an example of the processing executed by the server 2 for transmitting the response to be received by the client 3 in Step S16-1 when receiving the information transmitted by the client 3 in the processing of Step S12-2 in the flow of FIG. 7 described above.

First, the processing result information receiving section 35 issues a query to the authentication device 4 by using the authentication state identification information included in the received information, to thereby verify whether or not the authentication state identification information is effective (S12-3). If the verification fails in Step S12-3, the server 2 ends the processing. Also in this case, in the same manner as the case where a communication error occurs in Step S12 in the flow of FIG. 5, the processing is executed again.

On the other hand, if the verification is successful in Step S12-3, the processing result accepting section 36 judges whether or not the processing result identification information item Ip included in the information received from the client 3 is recorded in the storage section 12 as the transmitted identification information item Is (S13).

If it is judged in Step S13 that the received processing result identification information item Ip is recorded as the transmitted identification information item Is, the processing result accepting section 36 executes the point granting processing (S14). Specifically, the processing result accepting section 36 first performs the acceptance processing for the processing result information item Dp received from the client 3 along with the processing result identification information item Ip (S14-1). In other words, the processing result accepting section 36 performs processing to add the point represented by the processing result information item Dp to the point recorded by the server 2 in association with the user ID of the authenticated user. Subsequently, the processing result accepting section 36 performs the nullification processing for nullifying the transmitted identification information item Is (S14-2).

In both cases where it is judged in Step S13 that the processing result identification information item Ip is not recorded as the transmitted identification information item Is, and where the processing of Step S14 is executed after the processing result identification information item Ip is judged as being recorded as the transmitted identification information item Is, the processing result identification information transmitting section 31 executes the processing result identification information issuing processing (S15). In other words, the processing result identification information transmitting section 31 first issues a new processing result identification information item Ip (S15-1). Then, the processing result identification information transmitting section 31 records the issued processing result identification information item Ip in the storage section 12 as the transmitted identification information item Is in association with the user ID of the authenticated user (S15-2). Further, in response to the client 3 that has transmitted the processing result information item Dp, the processing result identification information transmitting section 31 transmits the processing result identification information item Ip issued in Step S15-1 along with the acceptance result information indicating whether or not the acceptance processing of Step S14-1 has been executed (S15-3), and ends the processing.

In the embodiment described above, the server 2 records the processing result identification information item Ip transmitted to the client 3 as the transmitted identification information item Is, and when the processing result information item Dp is received from the client 3, if the processing result identification information item Ip received along with the processing result information item Dp is recorded as the transmitted identification information item Is, performs the acceptance processing for the processing result information item Dp. This can prevent the server 2 from accepting one processing result information item Dp redundantly due to the user's illegal operation, a network problem, or the like.

Note that the embodiment of the present invention is not limited to the above-mentioned configuration. For example, in the above description, as the predetermined processing, each of the clients 3 executes processing to generate a point for each user while the server 2 manages the point granted to each user, but the present invention is not limited thereto, and the server 2 may accept results of various kinds of processing executed by the client 3, and manage the results. Further, in this embodiment, the user is authenticated by the authentication device 4 to thereby establish a connection between the server 2 and the client 3, but the server 2 and the client 3 may establish a connection directly without the intermediation of the authentication device 4 to perform data communications with each other.

Further, in the above description, the client 3 may store the data file F, in which the processing result identification information item Ip and the processing result information item Dp are recorded in association with each other, into the storage section 12 in a encrypted state. In addition, such control may be executed as to restrict the user's tampering or copying of the data file F. Those functions can make it even more difficult for the user to execute such an illegal operation as to cause the server 2 to redundantly accept the processing result information item Dp stored in the data file F.

What is claimed is:

1. An information processing system, comprising a client computer and a server computer, each including at least one processor, that can be communicatively connected to each other, the server computer comprising:
processing result identification information transmitting unit for transmitting processing result identification information to the client computer, and recording the transmitted processing result identification information as transmitted identification information, wherein the processing result identification information is a random number generated independently of a predetermined processing executed by the client computer;
processing result information receiving unit for receiving processing result information, which indicates a result of the predetermined processing executed by the client computer, from the client computer, along with the processing result identification information; and processing result information accepting unit for performing, if the processing result identification information received from the client computer corresponds to the transmitted identification information which has been recorded, acceptance processing for the processing result information received along with the processing result identification information, and nullifying the transmitted identification information, the client computer comprising:

processing result identification information receiving unit for receiving the processing result identification information from the server computer, and recording the received processing result identification information;

processing executing unit for executing the predetermined processing in a state where the received processing result identification information is recorded, irrespective of a state of a communicative connection with the server computer, and recording the processing result information indicating an execution result of the predetermined processing in association with the received processing result identification information in an accessible storage section, the processing executing unit judges, prior to execution of the predetermined processing, whether or not the processing result identification information is recorded in the storage section, and if recorded, executes the predetermined processing, and if not recorded, requests the server computer to transmit the processing result identification information, and executes the predetermined processing after the processing result identification information receiving unit receives the processing result identification information transmitted from the server computer in response to the request, wherein the processing executing unit: (i) executes the predetermined processing a plurality of times, and (ii) stores the processing result information a plurality of times, in association with the same processing result identification information; and processing result information transmitting unit for transmitting the recorded processing result information, which indicates results of the predetermined processing executed the plurality of times, to the server along with the recorded processing result identification information.

2. An information processing system according to claim 1, wherein:

if the processing result information receiving unit receives the processing result information from the client computer, the processing result identification information transmitting unit transmits new processing result identification information to the client computer irrespective of whether or not the processing result information accepting unit performs the acceptance processing for the received processing result information; and if the new processing result identification information is received, the processing result identification information receiving unit nullifies the processing result identification information recorded in the past, and records the received new processing result identification information.

3. An information processing system according to claim 2, wherein:

the processing result identification information receiving unit records the received new processing result identification information, and initializes the recorded processing result information; and when the predetermined processing is executed, the processing executing unit updates the recorded processing result information based on information corresponding to the recorded processing result information and a new execution result.

4. An information processing system according to claim 3, wherein the processing result information accepting unit executes, as the acceptance processing for the processing result information, processing for updating information regarding a processing result of the predetermined processing recorded on the server computer based on information corresponding to the recorded information regarding the processing result and the received processing result information.

5. An information processing system according to claim 4, wherein:

the processing result information includes numerical value information;

the processing result information accepting unit executes, as the acceptance processing for the processing result information, processing for updating the numerical value information recorded on the server computer by adding a numerical value represented by the received processing result information to the numerical value information recorded on the server computer;

the processing result identification information receiving unit records the received new processing result identification information, and initializes the recorded processing result information to "0"; and when the predetermined processing is executed, the processing executing unit updates the recorded processing result information by adding a numerical value corresponding to the new execution result to the numerical value represented by the recorded processing result information.

6. An information processing system according to claim 1, wherein:

the processing result identification information transmitting unit records the processing result identification information as the transmitted identification information in association with a user to whom the processing result identification information is to be transmitted;

the processing result information receiving unit receives the processing result information along with user-related information for identifying the user;

if the processing result identification information received from the client computer corresponds to the transmitted identification information which has been recorded in association with the user identified by the user-related information received along with the processing result identification information, the processing result information accepting unit performs the acceptance processing for the processing result information received along with the processing result identification information, and nullifies the transmitted identification information recorded in association with the user;

the processing result identification information receiving unit records the processing result identification information received from the server computer in association with the user to whom the processing result identification information has been transmitted;

the processing executing unit records the processing result information in association with the user to be subjected to the predetermined processing; and the processing result information transmitting unit transmits the recorded processing result information to the server computer along with the processing result identification information recorded in association with the user associated with the processing result information and the user-related information for identifying the user.

7. An information processing system according to claim 1, wherein nullifying the transmitted identification information comprises deleting the transmitted identification information from a table recorded in a server-side storage section.

8. An information processing system according to claim 1, wherein:
if the processing result information receiving unit receives a processing result identification information from the client computer having same value as the nullified transmitted identification information item after the nullification processing, not performing the acceptance processing for a processing result information received with the nullified processing result identification information.

9. A server computer, which can be communicatively connected to a client computer, comprising:
processing result identification information transmitting unit for transmitting, before the client computer executes a predetermined processing, processing result identification information to the client computer, and recording the transmitted processing result identification information as transmitted identification information, the processing result identification information is a random number generated independently of the predetermined processing executed by the client computer,
processing result information receiving unit for receiving processing result information, which indicates a result of the executed predetermined processing, from the client computer, along with the processing result identification information; and
processing result information accepting unit for performing, if the processing result identification information received from the client computer corresponds to the transmitted identification information which has been recorded, acceptance processing for the processing result information received along with the processing result identification information, and nullifying the transmitted identification information, wherein
the client computer: (i) records the processing result information indicating an execution result of the predetermined processing in association with the received processing result identification information in an accessible storage section, (ii) judges, prior to executing the predetermined processing, whether or not the processing result identification information received from the server computer is recorded in the storage section, and if recorded, executes the predetermined processing, and if not recorded, requests the server computer to transmit the processing result identification information, (iii) executes the predetermined processing a plurality of times, after the processing result identification information receiving unit receives the processing result identification information transmitted from the server computer in response to the request, and (iv) stores the processing result information a plurality of times, which indicates results of the predetermined processing executed the plurality of times, in association with the same processing result identification information.

10. A client computer, which can be communicatively connected to a server computer, comprising:
processing result identification information receiving unit for receiving processing result identification information from the server computer that generates the processing result identification information as a random number which is independent of a predetermined processing executed by the client computer, and recording the received processing result identification information;
processing executing unit for executing the predetermined processing in a state where the received processing result identification information is recorded, irrespective of a state of a communicative connection with the server computer, and recording processing result information indicating an execution result of the predetermined processing in association with the received processing result identification information in an accessible storage section, the processing executing unit judges, prior to executing the predetermined processing, whether or not the processing result identification information is recorded in the storage section, and if recorded, executes the predetermined processing, and if not recorded, requests the server computer to transmit the processing result identification information, and executes the predetermined processing after the processing result identification information receiving unit receives the processing result identification information transmitted from the server computer in response to the request, wherein the processing executing unit: (i) executes the predetermined processing a plurality of times, and (ii) stores the processing result information a plurality of times, in association with the same processing result identification information; and
processing result information transmitting unit for transmitting the recorded processing result information, which indicates results of the predetermined processing executed the plurality of times, to the server computer along with the recorded processing result identification information,
wherein the transmitted processing result identification information is used for judging whether or not acceptance processing for the transmitted processing result information is to be performed by the server computer.

11. An information processing method, which is performed by using a computer that can be communicatively connected to a client, the method comprising:
generating a random number that is used as a processing result identification information which is independent of a predetermined processing executed by the client;
transmitting, before the client executes the predetermined processing, processing result identification information to the client, and recording the transmitted processing result identification information as transmitted identification information, wherein the client: (i) records a processing result information indicating an execution result of the predetermined processing in association with the received processing result identification information in an accessible storage section, (ii) judges, prior to executing the predetermined processing, whether or not the processing result identification information is recorded in the storage section, and if recorded, executes, a plurality of times, the predetermined processing, and (iii) stores the processing result information a plurality of times, which indicates results of the predetermined processing executed the plurality of times, in association with the same processing result identification information;
receiving from the client, a request to transmit the processing result identification information when the client judges that the processing result identification information is not recorded in the storage section;

transmitting to the client in response to the request, the processing result identification information for recording in the storage section so that the client executes the predetermined processing after receiving the transmitted processing result identification information;

receiving processing result information, which indicates a result of the executed predetermined processing, from the client, along with the processing result identification information; and performing, if the processing result identification information received from the client corresponds to the transmitted identification information which has been recorded, acceptance processing for the processing result information received along with the same processing result identification information, and nullifying the transmitted identification information.

12. An information processing method, which is performed by using a computer that can be communicatively connected to a server, comprising:

receiving processing result identification information from the server, and recording the received processing result identification information, wherein the processing result identification information is a random number generated independently of a predetermined processing executed by the computer;

determining, prior to execution of the predetermined processing, whether the received processing result identification information is recorded;

transmitting a request to the server to send the processing result identification information if it is determined that the processing result identification information is not recorded;

executing predetermined processing, a plurality of times, in a state where the received processing result identification information is recorded, irrespective of a state of a communicative connection with the server, and recording processing result information indicating an execution result of the predetermined processing, executed the plurality of times;

storing the processing result information a plurality of times in association with the same processing result identification information; and transmitting the recorded processing result information to the server along with the recorded processing result identification information, wherein the transmitted processing result identification information is used for judging whether or not acceptance processing for the transmitted processing result information is to be performed by the server.

13. An non-transitory computer readable information storage medium, which contains a program that is capable of causing a computer, that can be communicatively connected to a server, to function as:

processing result identification information receiving unit for receiving processing result identification information from the server, and recording the received processing result identification information, wherein the processing result identification information is a random number generated independently of a predetermined processing executed by the computer;

processing executing unit for executing the predetermined processing in a state where the received processing result identification information is recorded, irrespective of a state of a communicative connection with the server, and recording processing result information indicating an execution result for the predetermined processing in association with the received processing result identification information in an accessible storage section, the processing executing unit judges, prior to executing the predetermined processing, whether or not the processing result identification information is recorded in the storage section, and if recorded executes the predetermined processing, and if not recorded, requests the server computer to transmit the processing result identification information, and executes the predetermined processing after the processing result identification information receiving unit receives the processing result identification information transmitted from the server computer in response to the request, wherein the processing executing unit: (i) executes the predetermined processing a plurality of times, and (ii) stores the processing result information a plurality of times, in association with the same processing result identification information; and processing result information transmitting unit for transmitting the recorded processing result information, which indicates results of the predetermined processing executed the plurality of times, to the server, along with the recorded processing result identification information, wherein the transmitted processing result identification information is used for judging whether or not acceptance processing for the transmitted processing result information is to be performed by the server.

* * * * *